(12) United States Patent
Hsu et al.

(10) Patent No.: US 11,724,451 B2
(45) Date of Patent: Aug. 15, 2023

(54) IN-PROCESS ULTRASONIC POLLING OF 3D PRINTED CRYSTALLINE/SEMI-CRYSTALLINE ELECTROACTIVE POLYMERS

(71) Applicant: University of Louisville Research Foundation, Inc., Louisville, KY (US)

(72) Inventors: Keng Hsu, Louisville, KY (US); Alireza Tofangchi, Louisville, KY (US); Thomas A. Berfield, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 269 days.

(21) Appl. No.: 16/713,868

(22) Filed: Dec. 13, 2019

(65) Prior Publication Data

US 2020/0189188 A1 Jun. 18, 2020

Related U.S. Application Data

(60) Provisional application No. 62/780,026, filed on Dec. 14, 2018.

(51) Int. Cl.
| | | |
|---|---|---|
| *B29C 64/209* | (2017.01) | |
| *B29C 64/227* | (2017.01) | |
| *B29C 64/295* | (2017.01) | |
| *B29C 64/118* | (2017.01) | |

(Continued)

(52) U.S. Cl.
CPC .......... *B29C 64/209* (2017.08); *B29C 64/118* (2017.08); *B29C 64/227* (2017.08);
(Continued)

(58) Field of Classification Search
CPC ............................. B29C 64/118; B29C 64/209
See application file for complete search history.

(56) References Cited

U.S. PATENT DOCUMENTS 10,254,499 B1 * 4/2019 Cohen ................... G02B 6/25
2015/0174824 A1 * 6/2015 Gifford ................ B29C 64/182
425/183

(Continued)

OTHER PUBLICATIONS

Chen & Li (2004) Effect of ultrasound on extrusion of PP/EPDM blends: Structure and mechanical properties. Polymer Engineering and Science, vol. 44, No. 8, pp. 1509-1513.

(Continued)

*Primary Examiner* — Joseph S Del Sole
*Assistant Examiner* — Ariella Machness
(74) *Attorney, Agent, or Firm* — Jenkins, Wilson, Taylor & Hunt, P.A.

(57) ABSTRACT

Methods and systems for producing a structure having selectable piezoelectric properties via additive manufacturing. Such methods can include coupling an ultrasound generating device to a print head of the additive manufacturing apparatus; transmitting acoustic energy from the ultrasound generating device to the print head to vibrate the print head in an oscillatory manner; extruding a feed material from the print head; moving the print head in at least one dimension relative to a substrate on which the structure is being manufactured; and dispensing layers sequentially on top of each other to form the structure. Such systems can include an additive manufacturing apparatus comprising a print head movable in at least one dimension relative to a base configured to support the structure being produced; and an ultrasound generating device that is connected to the print head.

10 Claims, 10 Drawing Sheets

(51) Int. Cl.
 B33Y 10/00 (2015.01)
 B33Y 70/00 (2020.01)
 B33Y 40/00 (2020.01)
 B33Y 30/00 (2015.01)
 B29K 27/00 (2006.01)

(52) U.S. Cl.
 CPC ........ *B29C 64/295* (2017.08); *B29K 2027/16* (2013.01); *B29K 2995/0003* (2013.01); *B29K 2995/0041* (2013.01); *B33Y 10/00* (2014.12); *B33Y 30/00* (2014.12); *B33Y 40/00* (2014.12); *B33Y 70/00* (2014.12)

(56) References Cited

U.S. PATENT DOCUMENTS

| | | | | |
|---|---|---|---|---|
| 2018/0326660 | A1* | 11/2018 | Gifford | B29C 64/241 |
| 2019/0283319 | A1* | 9/2019 | Rhoads | B29C 64/118 |
| 2019/0284423 | A1* | 9/2019 | Bodkhe | H01L 41/193 |
| 2020/0223129 | A1* | 7/2020 | Gallé | B29C 64/209 |
| 2021/0221056 | A1* | 7/2021 | Gjovik | B33Y 30/00 |

OTHER PUBLICATIONS

Chen & Li (2005) Effect of ultrasound on the morphology and properties of polypropylene/inorganic filler composites. Journal of Applied Polymer Science, vol. 97, No. 4, pp. 1553-1560.

Chen & Li (2007) Mechanism for effect of ultrasound on polymer melt in extrusion. Journal of Polymer Science Part B-Polymer Physics, vol. 45, No. 10, pp. 1226-1233.

Chen et al. (2002) Ultrasonic improvement of rheological behavior of polystyrene. Journal of Applied Polymer Science, vol. 84, No. 13, pp. 2451-2460.

Chen et al. (2010) Physical and chemical effects of ultrasound vibration on polymer melt in extrusion. Ultrasonics Sonochemistry, vol. 17, No. 1, pp. 66-71.

Guo et al. (2009) Ultrasonic Oscillations Effect on Extrusion Processing, Structure, and Properties of Blends of Propylene Based Plastomer and Ethylene/1-Octene Copolymer. Journal of Reinforced Plastics and Composites, vol. 28, No. 22, pp. 2701-2715.

Isayev et al. (2008) Ultrasound assisted single screw extrusion process for dispersion of carbon nanofibers in polymers. International Polymer Processing, vol. 23, No. 4, pp. 395-405.

Liao et al. (2017) Ultrasonic fabrication of micro nozzles from a stack of PVDF foils for generating and characterizing microfluidic dispersions. Microsystem Technologies-Micro-and Nanosystems-Information Storage and Processing Systems, vol. 23, No. 3, pp. 695-702.

Nallappan & Nasef (2015) Optimization of Elecrospinning of PVDF Scaffolds Fabrication Using Response Surface Method. Jurnal Teknologi, vol. 75, No. 6, pp. 103-107.

Porter et al. (2017) Effects of in-situ poling and process parameters on fused filament fabrication printed PVDF sheet mechanical and electrical properties. Additive Manufacturing, vol. 13, pp. 81-92.

\* cited by examiner

IN-PROCESS ULTRASONIC POLLING OF 3D PRINTED CRYSTALLINE/SEMI-CRYSTALLINE ELECTROACTIVE POLYMERS

CROSS-REFERENCE TO RELATED APPLICATIONS

This application claims priority to U.S. Provisional Patent Application Ser. No. 62/780,026, filed Dec. 14, 2018, the entirety of which is herein incorporated by reference.

TECHNICAL FIELD

The presently disclosed subject matter relates in some embodiments to methods for producing crystalline beta phase in polyvinylidenefluoride and its co-polymers to facilitate functional electroactive properties in Fused Filament Fabrication (FFF) 3D printed components.

BACKGROUND

Electroactive polymers such as polyvinylidenefluoride (PVDF) and its co-polymers such as poly[vinylidenefluoride-co-trifluoroethylene] (P(VDF-TrFE)) are known to have high piezoelectric and ferroelectric response properties, as well as superior mechanical, thermal-mechanical, and chemical resistive properties [1]. Its d33 piezoelectric and pyroelectric constants have recently been reported to reach as high as −30 pC/N and −50 μC/(m$^2$*K), respectively, upon proper poling and post processing [2]. Combined with the fact that its piezo constant-to-density ratio approaches that of PZT-based piezoelectric ceramics, such electroactive co-polymers have high potential for use in high performance sensing, actuation, and energy harvesting applications, when combined with other functional materials [3-8].

The electro-mechanical coupling properties of PVDF, and its copolymer P(VDF-TrFE), are highly linked to the material microstructure after specimen fabrication. The microstructural phases of this polymer are, in turn, a function of the rheology, stress state, and thermal history the polymeric material experiences during processing. PVDF has five recognized semi-crystalline phases, four of the phases of which have a net dipole (α, β, γ, δ) [1, 2]. However, of these net dipole phases, the beta (β) phase is most critical for practical "smart" material applications, as this β-phase demonstrates the most significant pyroelectric, piezoelectric, and ferroelectric responses [9]. The alpha (α) phase shown depicted in FIG. 1A forms most readily from most traditional manufacturing method melts due to its thermodynamic favorability, while the all-trans zig-zag configuration of PVDF is shown in FIG. 1B in the beta (β) phase. Due to its polar molecular structure, the β-phase gives bulk PVDF a significant piezoelectric response, provided that the material has been properly electrically poled to maximize dipole alignment. While electrical poling is critical to PVDF polymers demonstrating a measurable piezoelectric response, the stress state of the polymer during processing is the dominant factor in determining the prevalence of β-phase formation [10].

Conversion from α-phase (or other phases) into the β-phase is typically achieved through a combination of mechanisms/pathways, but the primary mechanism/pathway is via introducing stress and thermal energy to the polymer. Mechanical stretching [11-13] up to 300% strain, mostly performed uniaxially but occasionally biaxially in nature, is a common method for converting α-phase into β-phase content. This is the route used for the majority of commercially produced piezoelectric PVDF sheets. The environmental temperature during the application of stresses to the PVDF material [14], quench rate [9], and the water/solvents selected [15], are key factors that can further influence the relative content of the respective phases in the resulting piezoelectric PVDF sheets. By extension, the effective piezoelectric performance becomes highly dependent on controlled manufacturing conditions. Though these traditional manufacturing processes can produce piezoelectric PVDF polymer sheets, the two-dimensional form of these sheets greatly limits their end-use applications.

PVDF and its co-polymers, though high-performance materials, present significant challenges in fabrication due to their innate physical and mechanical properties. Current processing and fabrication methods demonstrated to show moderate success are mechanical rolling, electro-spinning, spin-casting, molding, and coating [16-25]. In addition to needing a post-fabrication poling process (e.g., either mechanical or electrical) to obtain the piezoelectric properties in these materials, currently known fabrication methods only allow for the manufacture of substantially one-dimensional filaments (e.g., a structure having only a length, with the height/width being comparatively negligible to the length) or 2D sheets of these polymers. Limited work in 3D printing combined with in-process electrical or corona poling of PVDF to produce functional material in as-printed states [24, 26-29]. The critical issues facing extrusion-based (or FFF) fabrication of functional PVDF are not unlike those facing FFF of other thermoplastics that stem from rheological and thermal-mechanical behaviors of material. Critical issues can range from dimension and geometry [30-32], to thermal stresses and shrinkage [30, 33, 34], and physical and mechanical property anisotropy [33, 35-41]. Combined with the lack of piezoelectric properties in FFF-printed PVDF, the high potential of 3D printing in advancing the application of PVDF is so far known to be significantly limited by such issues.

As will be discussed further herein, a novel method and system of applying 40 kHz ultrasound vibrations to a nozzle of an FFF additive manufacturing technique of PVDF and P(VDF-TrFE) is disclosed herein, resulting in appreciable increases in beta-phase formation in PVDF [42, 43].

SUMMARY

This summary lists several example embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

A method of producing a structure having selectable piezoelectric properties using an additive manufacturing apparatus is disclosed herein, the method comprising: coupling an ultrasound generating device to a print head of the additive manufacturing apparatus; transmitting acoustic energy from the ultrasound generating device to the print head to vibrate the print head in an oscillatory manner; extruding a feed material from the print head; moving the print head in at least one dimension relative to a substrate on which the structure is being manufactured; and dispensing layers sequentially on top of each other to form the structure.

In some embodiments of the method, the feed material comprises a polymeric material.

In some embodiments of the method, the polymeric material is heated by a heater block within a hot-end section of the print head to form a polymer melt.

In some embodiments of the method, the acoustic energy causes an alignment and/or relaxation of polymeric chains within the polymer melt.

In some embodiments of the method, the alignment and/or relaxation of the polymeric chains causes the structure to have piezoelectric properties.

In some embodiments, the method comprises cooling the polymer melt after extrusion from the print head to fix the polymeric chains within the polymer melt, such that the alignment and/or relaxation of the polymeric chains is maintained by a hardening of the polymer melt during the cooling thereof.

In some embodiments of the method, the polymeric material comprises polyvinylidenefluoride (PVDF) and/or a co-polymer thereof, including poly[vinylidenefluoride-co-trifluoroethylene] (P(VDF-TrFE)).

In some embodiments of the method, transmitting acoustic energy comprises selectively applying acoustic energy to the print head by changing the ultrasound generating device between an on state and an off state.

In some embodiments, the method comprises: dispensing portions of the structure while the ultrasound generating device is in the on state so that the portions of the structure have piezoelectric properties; and dispensing other portions of the structure while the ultrasound generating device is in the off state so that the other portions of the structure do not have piezoelectric properties and act as insulators.

In some embodiments of the method, each layer being dispensed has a shape corresponding to a portion of a cross-section of the structure being manufactured.

In some embodiments of the method, vibrating the print head in the oscillatory manner comprises moving the print head in a direction orthogonal to a longitudinal axis of the print head and/or in a direction parallel to the longitudinal axis of the print head.

In some embodiments of the method, the polymer melt is extruded from a nozzle of the print head, the nozzle being coaxial to the longitudinal axis of the print head.

In some embodiments of the method, the acoustic energy has a frequency that is substantially similar to a natural frequency of the additive manufacturing apparatus.

A system for producing a structure having selectable piezoelectric properties via additive manufacturing is disclosed herein, the system comprising: an additive manufacturing apparatus comprising a print head movable in at least one dimension relative to a base configured to support the structure being produced; and an ultrasound generating device that is connected to the print head, the ultrasound generating device being configured to generate acoustic energy that is transferred to a polymer melt contained within the print head, wherein the acoustic energy causes an oscillatory vibration of the print head; wherein the print head is configured to extrude the polymer melt over a substrate and/or over a previously deposited layer of the structure.

In some embodiments of the system, the structure is formed by sequentially dispensing layers of the polymer melt extruded from the print head on top of each other.

In some embodiments, the system comprises a heater block within a hot-end section of the print head that heats a polymeric feeder material to form the polymer melt.

In some embodiments of the system, the acoustic energy causes an alignment and/or relaxation of polymeric chains within the polymer melt.

In some embodiments of the system, the alignment and/or relaxation of the polymeric chains causes the structure to have piezoelectric properties.

In some embodiments of the system, the polymeric chains are fixed within the polymer melt after the polymer melt is extruded from the print head, such that the alignment and/or relaxation of the polymeric chains is maintained by a hardening of the polymer melt when the polymer melt is cooled.

In some embodiments of the system, the ultrasound generating device is configured to selectively apply acoustic energy to the print head by changing the ultrasound generating device between an on state and an off state.

In some embodiments of the system, portions of the structure are dispensed while the ultrasound generating device is in the on state so that the portions of the structure have piezoelectric properties; and other portions of the structure are dispensed while the ultrasound generating device is in the off state so that the other portions of the structure do not have piezoelectric properties and act as insulators.

In some embodiments of the system, the polymer melt is created by melting a source of a polymer comprising polyvinylidenefluoride (PVDF) and/or a co-polymer thereof, including poly[vinylidenefluoride-co-trifluoroethylene] (P(VDF-TrFE)).

In some embodiments of the system, each dispensed layer has a shape corresponding to a cross-section of the structure being produced.

In some embodiments of the system, the oscillatory vibration of the print head is caused by a movement of the print head in a direction orthogonal to a longitudinal axis of the print head and/or in a direction parallel to the longitudinal axis of the print head.

In some embodiments of the system, the polymer melt is extruded from a nozzle of the print head, the nozzle being coaxial to the longitudinal axis of the print head.

In some embodiments of the system, the acoustic energy has a frequency that is substantially similar to a natural frequency of the additive manufacturing apparatus.

DETAILED DESCRIPTION

The presently disclosed subject matter relates to methods that can produce significant amounts of crystalline beta phase in PVDF and its co-polymers such as P(VDF-TrFE) to allow functional electroactive properties in Fused Filament Fabrication (FFF) 3D printed components. This technique will enable new methods for 3D printing of piezoelectric/electroactive polymeric materials, including exploring particulate effects for composite-based filaments, directed towards producing superior mechanical and electroactive properties compared to conventionally FFF-3D printed counterparts. In some embodiments, appropriate applications can extend beyond corrosion-resistant components to high-performance soft sensors and actuators such as electronic skins, mechanical energy harvesters, and artificial muscles.

Figure 1A:
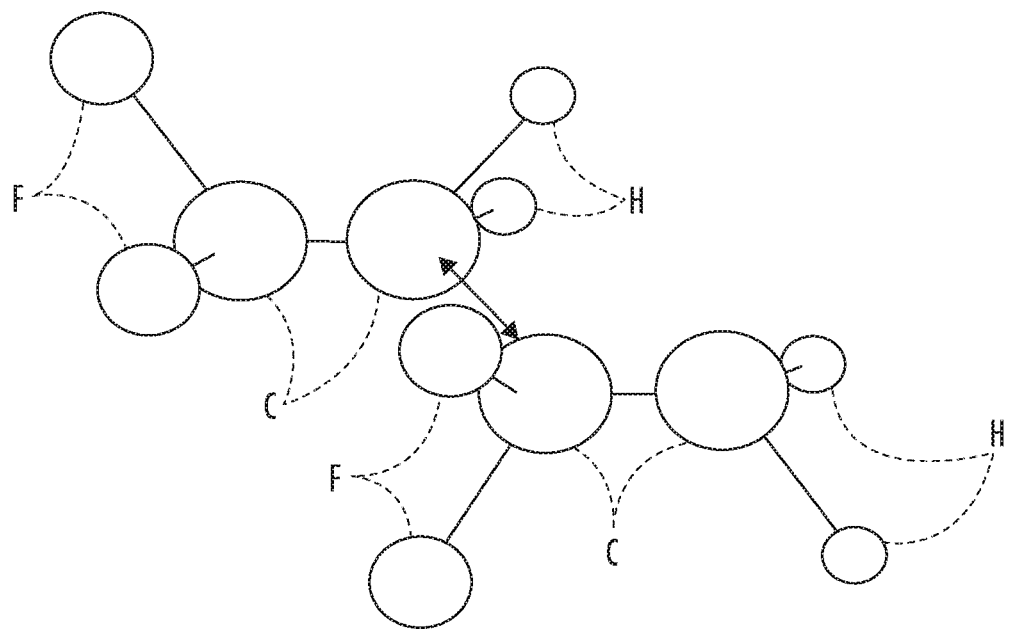
FIGS. 1A and 1B are depictions of the $\alpha$ phase and of the $\beta$ phase of PVDF, respectively.
Figure 1B:
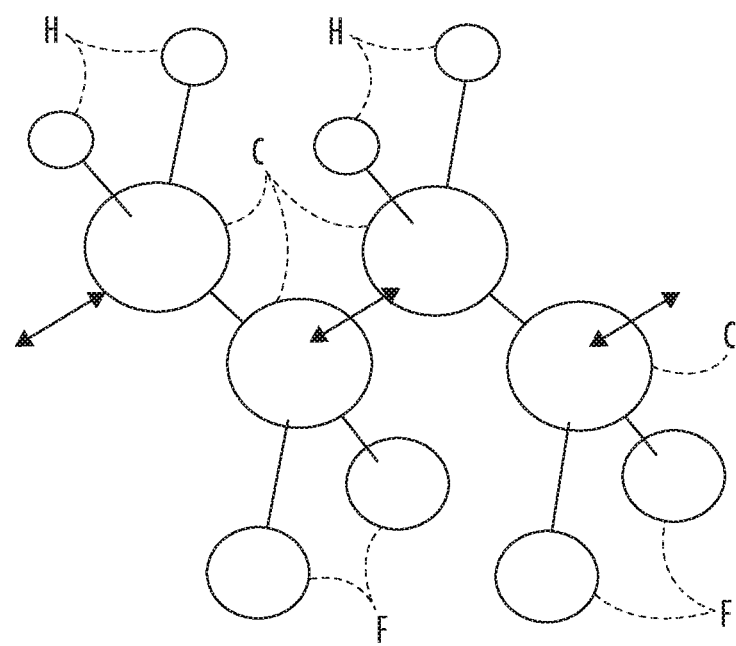
Figure 2:
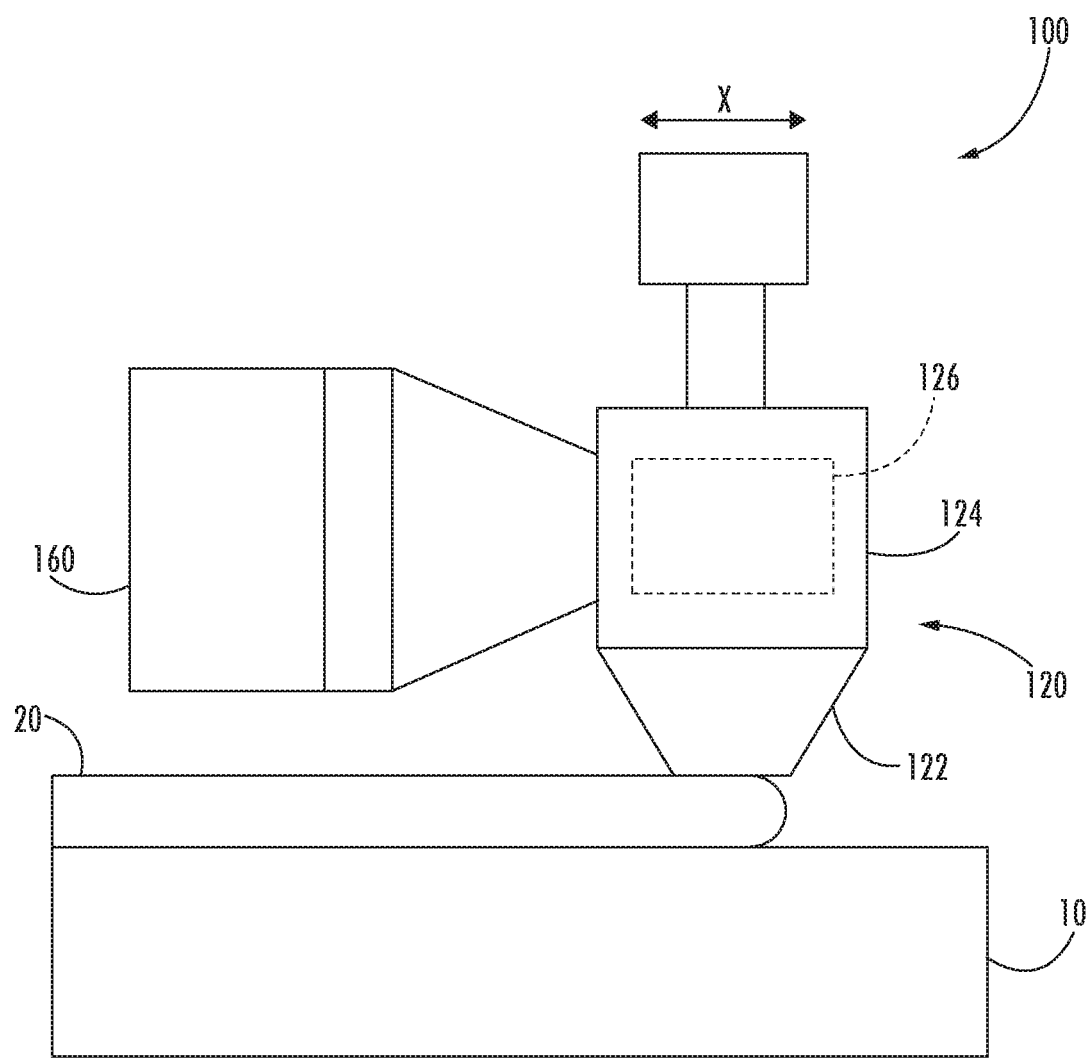
FIG. 2 depicts an example embodiment of an apparatus for ultrasound-assisted FFF of PVDF and ABS.

FIG. 2 shows a first example embodiment of an apparatus, generally designated 100, of a modified open-source polymer 3D printer used to produce a 25 mm (L)×25 mm (W)×0.3 mm (D) specimen 20, which can also be referred to herein as a "structure," which can include a single-layer HOMO-PVDF and/or Copolymer P(VDF-TrFE), using an FFF technique. In this embodiment, the apparatus 100 includes a print head, generally designated 120, in which a polymer feed material is fed into the print head 120, heated by a heater block 126 of a hot-end section 122 of the print head 120, and extruded over a substrate 10 through a nozzle 122 attached at an outlet of the print head 120 to form the specimen 20 on top of the substrate 10. In some embodiments, the hot-end section 122 is a melt chamber. In some embodiments, the substrate 10 can be an inert material to which the specimen 20 is not bonded during its formation. In other embodiments, the substrate 10 can be a previously deposited layer of a multi-layer specimen of a same or different material, such that the specimen 20 is bonded to the substrate 10 as the feed material is extruded from the nozzle 122 of the print head 120. An ultrasonic transducer 160 is attached, directly in the example embodiment shown, but indirectly in other embodiments, to the hot-end section 124 of the print head 120 to induce vibration energy into the feed material while it is being heated by the heater block 126 as it passes through the print head 120 to be extruded from the nozzle 122 to form the specimen 20. The print direction X is substantially aligned with the longitudinal axis of the transducer 160.

In order to validate the subject matter disclosed herein, control specimens and specimens using transverse vibration mode ultrasound acoustic energy at 42 kHz were produced using identical print parameters on the same apparatus 100. Other parameters of production include a 0.3 mm layer thickness of the specimen 20, a print temperature of 220° C. for the feed material exiting the nozzle 122, a print speed of 200 mm/min, and an extrusion multiplier of 1.02.

Figure 3A:
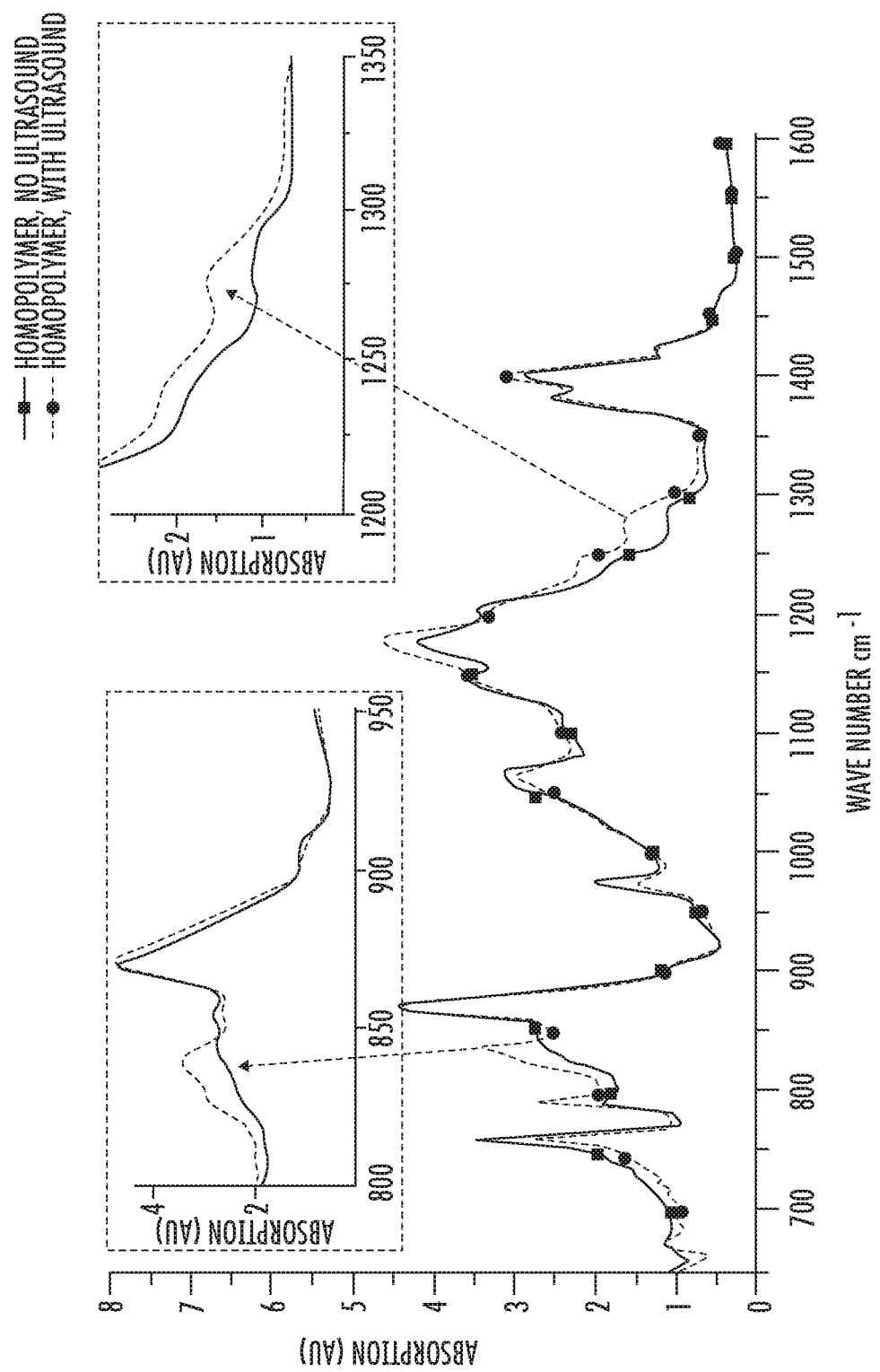
FIGS. 3A and 3B are Fourier Transformed Infrared Spectrum (FTIR) spectra of Homo-PVDF and P(VDF-TrFE) printed in control conditions and in ultrasound-assisted FFF conditions, respectively.
Figure 3B:
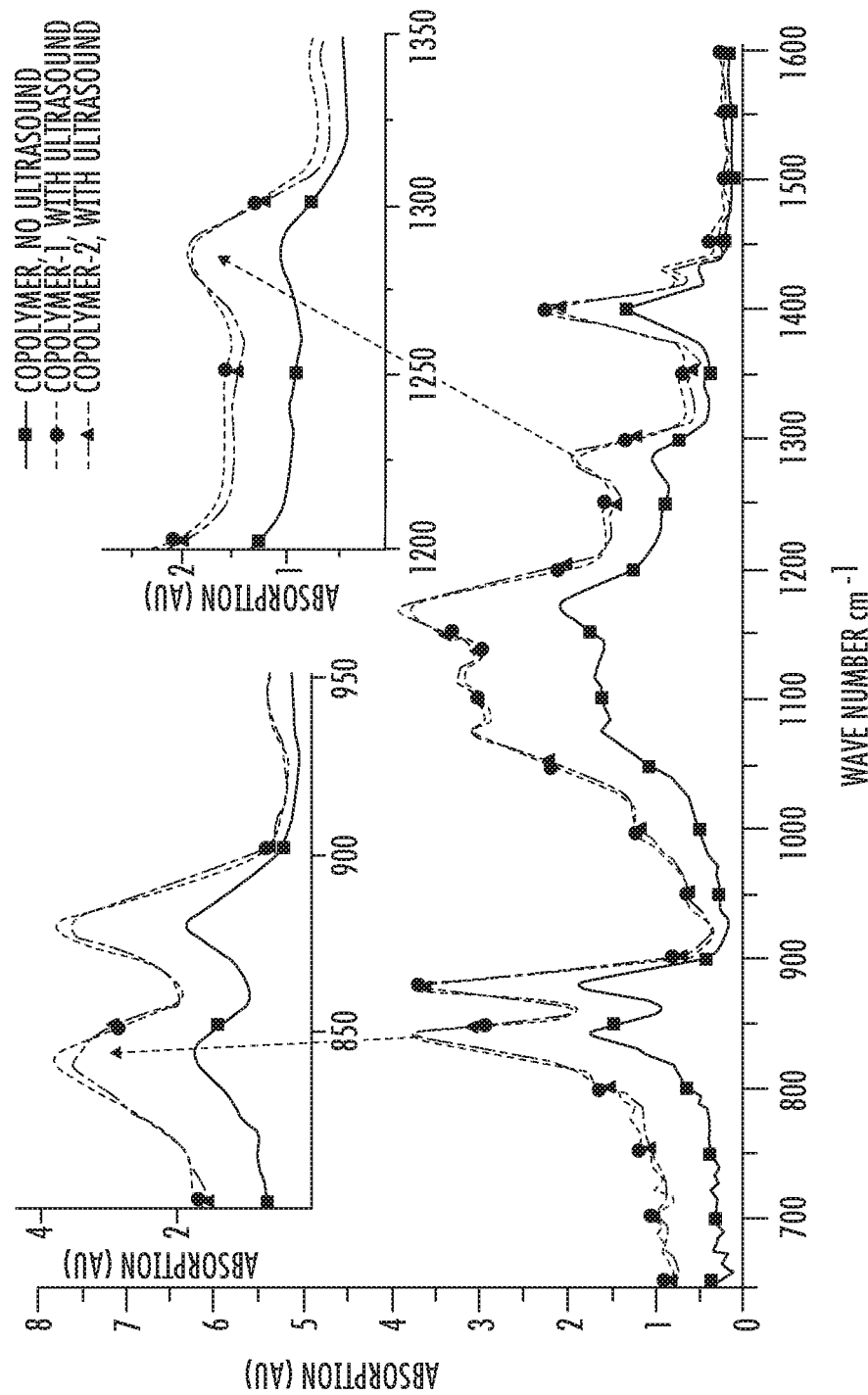

The characterization of PVDF against the presence of the β-phase can be performed using Fourier Transformed Infrared Spectrum (FTIR) to examine the absorption of the polymer at 839 $cm^{-1}$ ($CH_2$ rocking, skeletal C—C stretching, and $CF_2$ stretching) as well as the peak at 1279 $cm^{-1}$ (Trans band)) [12, 16, 52]. Shown in FIGS. 3A and 3B are two sets of initial experimental results where the FTIR spectra and 839 $cm^{-1}$ and the 1279 $cm^{-1}$ peaks were obtained, respectively, from 3 homo-PVDF and copolymer P(VDF-TrFE) specimens FFF-printed with the assistance of ultrasound energy and controls (e.g., no ultrasound). In FIG. 3A, the absorption for homopolymer without ultrasound is shown in solid line with squares and the absorption for homopolymer with ultrasound is shown in broken line with circles. In FIG. 3B, the absorption for co-polymer without ultrasound is shown in solid line with squares, the absorption for co-polymer-1 with ultrasound is shown in broken line with circles, and the absorption for copolymer 2 with ultrasound is shown in dot-dash-dot broken line with triangles. Qualitative evidence of an increased presence of β-phase was observed in both homo-PVDF and copolymer P(VDF-TrFE) produced using the ultrasound-assisted additive manufacturing apparatus 100 of FIG. 2 in a transverse mode (e.g., oscillations of the print head 120 are oriented orthogonal to the direction of extrusion of the feed material from the print head 120). This increased presence of β-phase is demonstrated by the prominence of both the 840 $cm^{-1}$ and the 1279 $cm^{-1}$ peaks, along with simultaneous suppression of the peak at 749 $cm^{-1}$ in HOMO-PVDF.

Figure 4A:
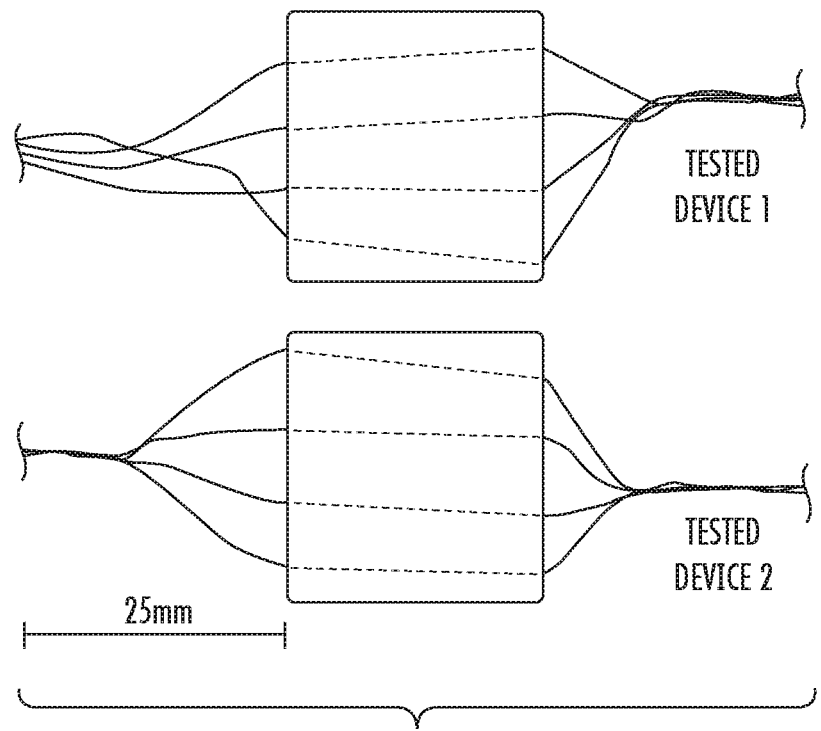
FIGS. 4A and 4B show an example embodiment for an electrostatic polymer device testing configuration and the results therefor, respectively.
Figure 4B:
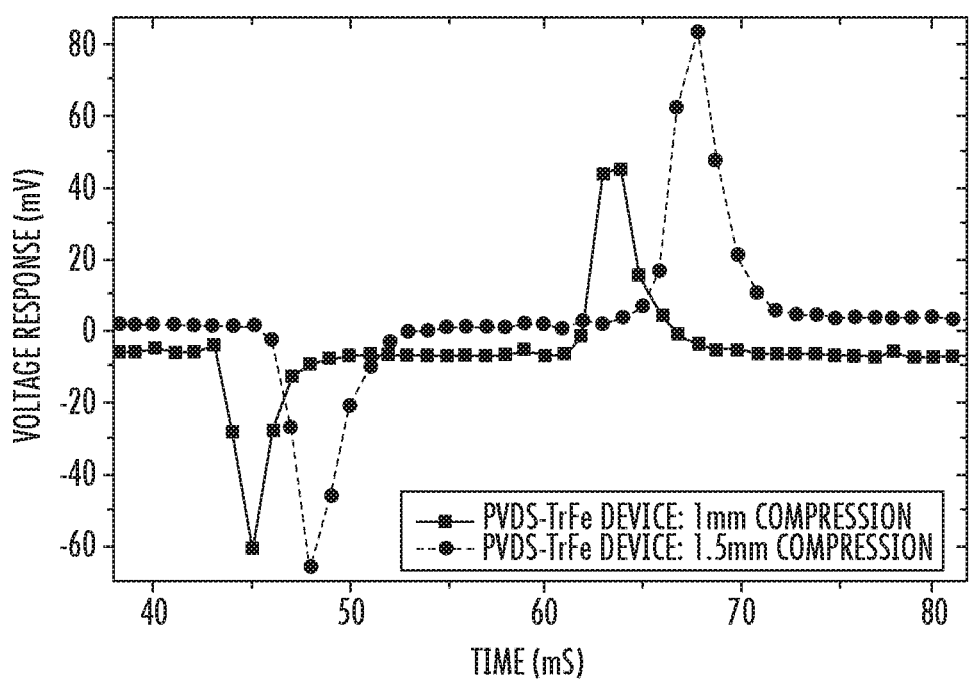

In a second example embodiment, specimen fabrication was accomplished in separate steps on a custom 3D printer system configured to allow polymer FFF 3D printing and Metal Directed Acoustic Energy Deposition (DAED) processes. The specimen was designed such that the d13 piezoelectric properties of the P(VDF-TrFE) could be measured and quantified. FIG. 4A shows a top view of the actual specimens tested. FIG. 4B shows testing results from the specimens in terms of measured charge in the metal features in the device when the device was compressed in the thickness direction to induce varying amounts of stress on the specimens. In FIG. 4B, the voltage response results for a PVDF-TrFE device with 1 mm compression are shown in solid line with squares and the voltage response results for a PVDF-TrFE device with 1.5 mm compression are shown in broken line with circles.

Figure 5:
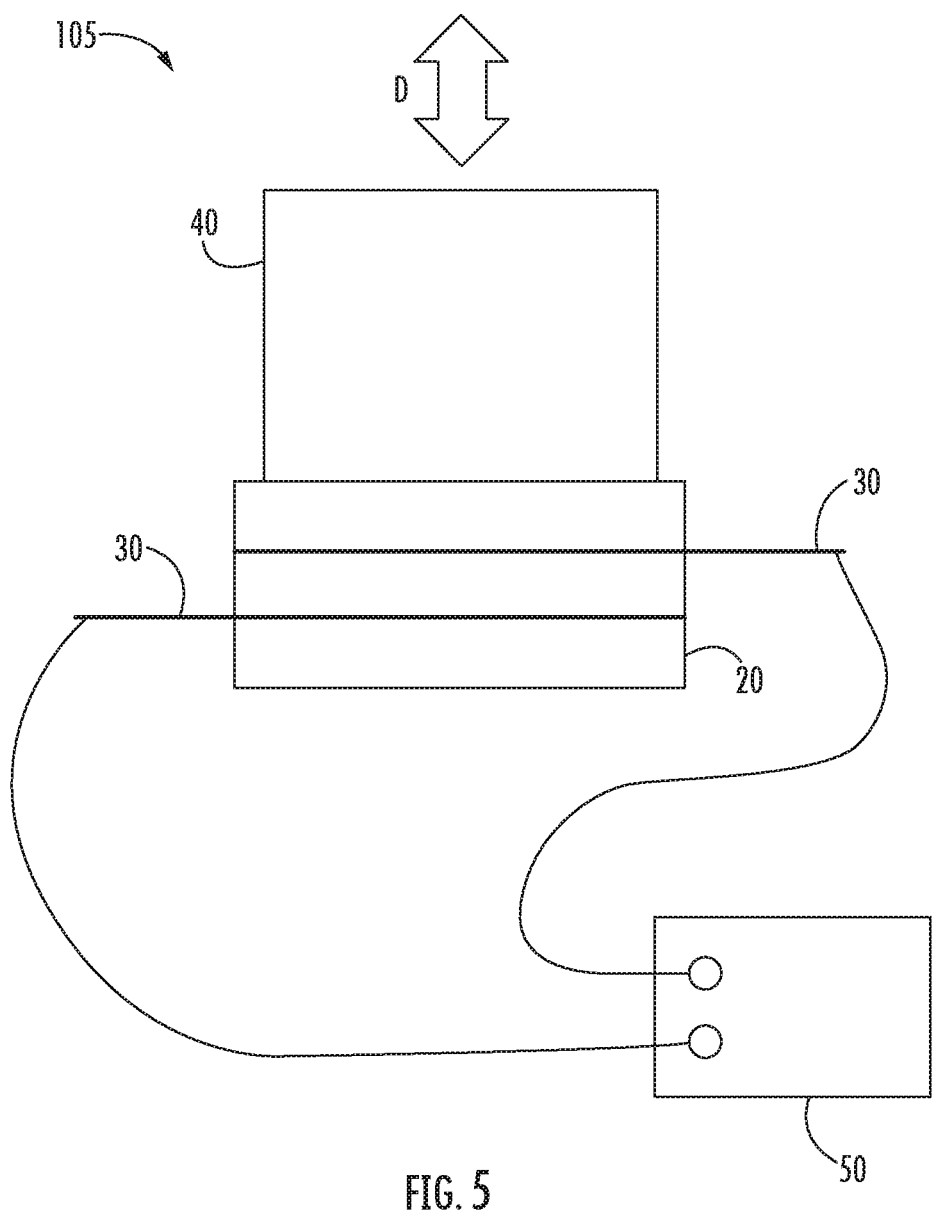
FIG. 5 shows an example electroactive polymer device design.

FIG. 5 is a schematic illustration of the specimen design, testing configuration, and testing apparatus, generally designated 105. In this embodiment, the specimen 20 has metallic features 30, e.g., wires, tabs, or layers formed within the specimen 20 made from aluminum or copper, embedded within the specimen 20. The specimens 20 are made of a polymeric material, for example, HOMO-PVDF or Copolymer P(VDF-TrFE). The metallic features 30 are connected to a data acquisition system 50 configure to measure voltage induced in the specimen 20. A compression ram 40 is provided over the specimen 20 to compress the specimen 20 and generate a voltage that can be measured and recorded by the data acquisition system 50. To generate the data shown in FIG. 4B, the compression ram 40 is moved in the direction D to compress the specimen 20 by 1 mm and 1.5 m, respectively.

Figure 6:
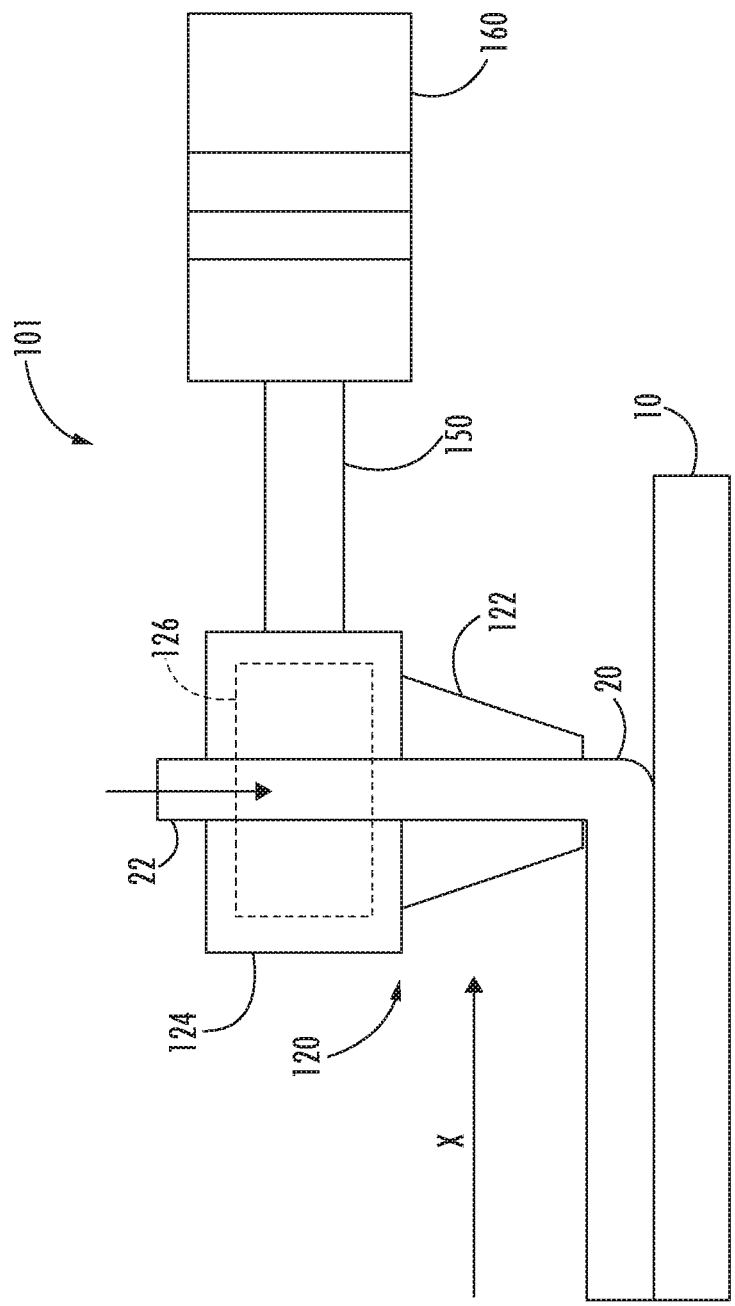
FIG. 6 is a schematic illustration of an example embodiment of an ultrasound-assisted additive manufacturing apparatus.
Figure 7A:
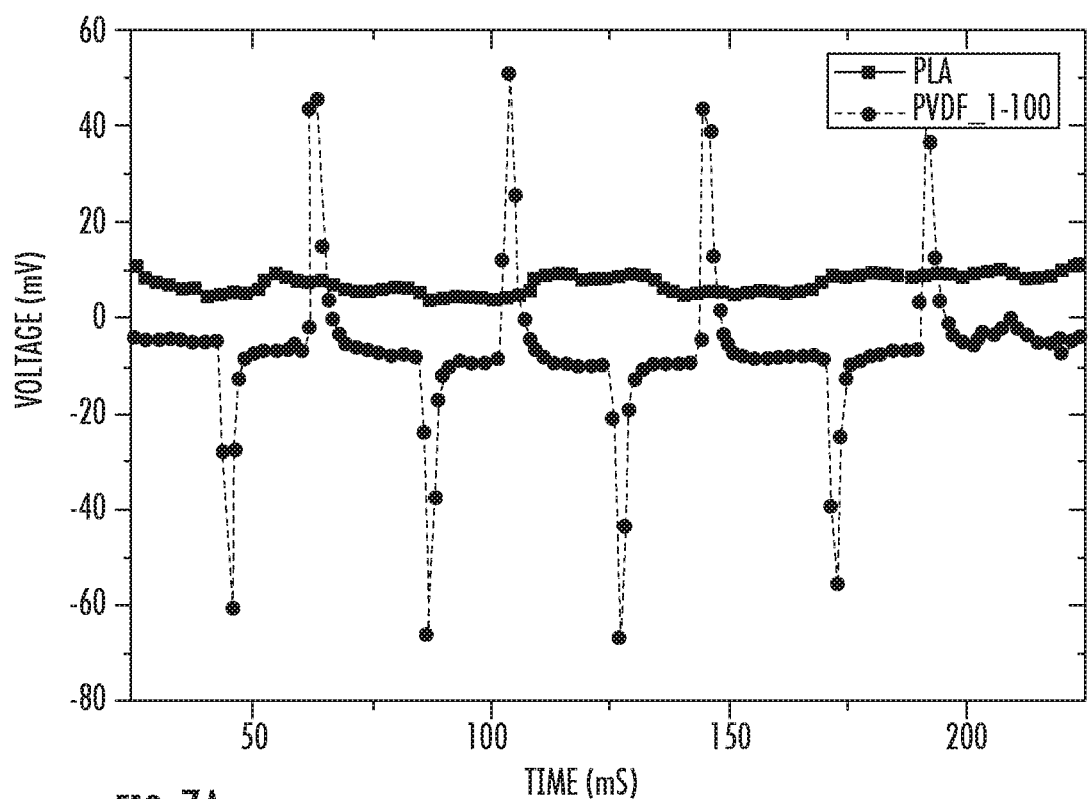
FIGS. 7A-7F show results of tests of example specimens conducted at several conditions
Figure 7B:
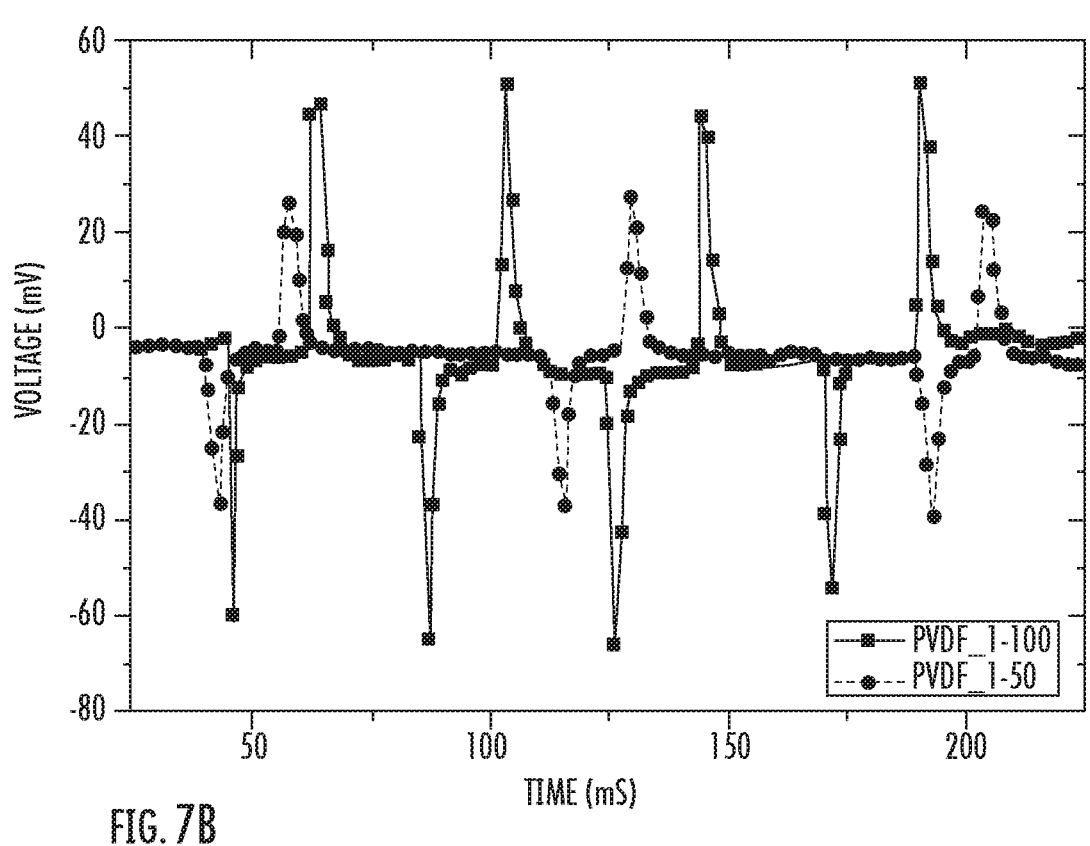
Figure 7C:
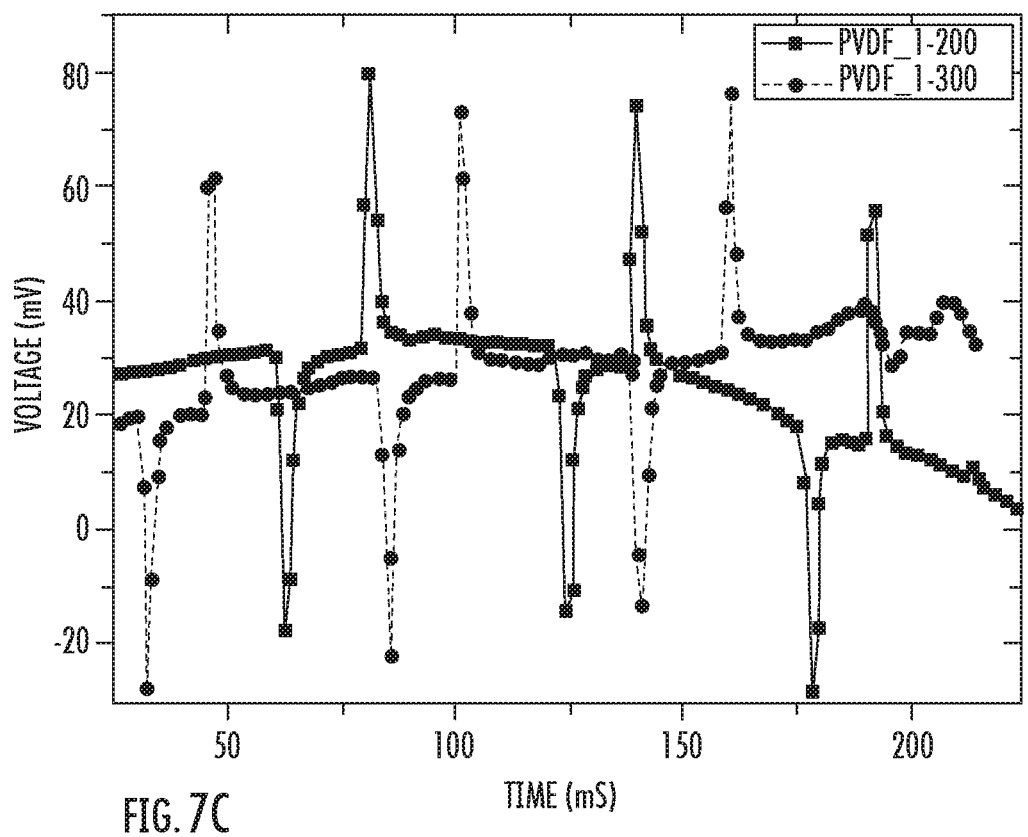
Figure 7D:
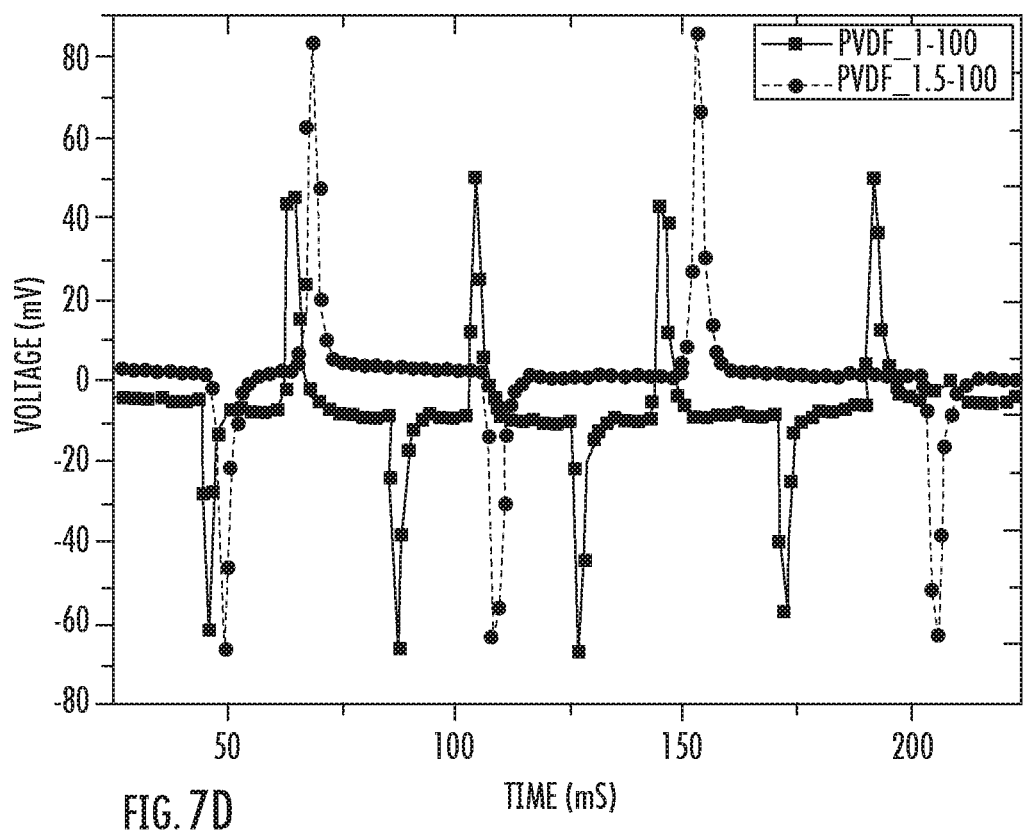
Figure 7E:
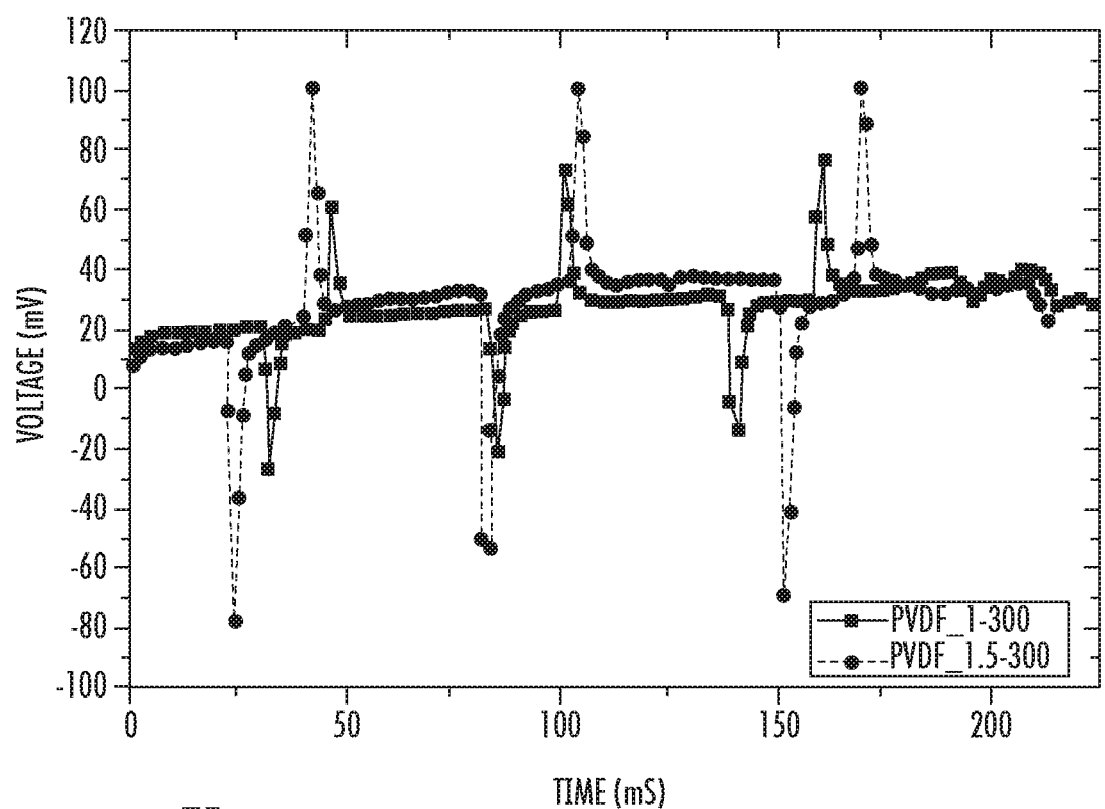
Figure 7F:
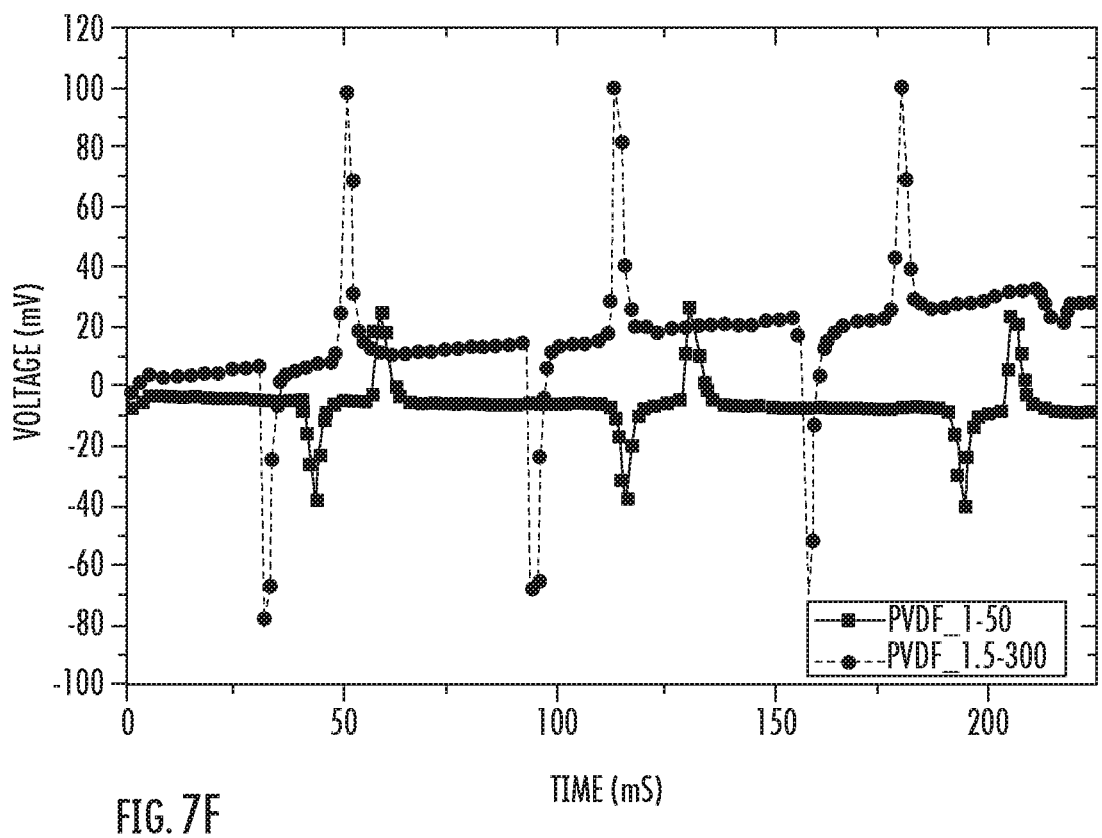

FIG. 6 is a schematic illustration of an embodiment of a validated additive manufacturing apparatus, generally designated 101. In this example embodiment, a 40 kHz piezoelectric crystal-based transducer 160 was rigidly connected to a heater block 126 in the hot-end section 124 of the print head, generally designated 120, using a connecting rod 150, which can be made of any suitable metal, including, for example, 304 stainless-steel, and threaded fasteners (e.g., screws). A nozzle 122 through which the polymer material is to be extruded after being heated and vibrated within the hot-end section 124 of the print head 120 is connected at the outlet of the hot-end section 124. The connecting rod 150 couples vibrations generated by the transducer 160 to the print head 120, while reducing heat transfer from the heater block 126 within the print head 120 into the transducer 160. With the transducer 160 connected to the hot-end section 124 of the print head 120 by the connecting rod 150, the overall resonant frequency of the apparatus 101 was measured to be 34.4 kHz using a single point laser-Doppler vibrometer. A frequency-adjustable ultrasonic signal generator was adjusted to the resonant frequency of the apparatus 101 and connected to the transducer 160 to provide excitation signals that cause the nozzle 122 to vibrate at the measured resonant frequency.

To prepare each specimen (e.g., "component," "part," or "structure") printed with ultrasound assistance, the transducer 160 was activated prior to, or simultaneous with, deposition of the top layer 20 over the substrate 10. The print conditions and parameters in all specimens created using ultrasound assistance were identical to those in the control specimens, which were produced without the use of any ultrasound energy from the transducer 160.

FIGS. 7A-7F show empirical results of example specimens conducted at several conditions in the testing apparatus 105 shown in FIG. 5. In FIGS. 7A-7F, it can be observed that the charge accumulation generated in the metal features 30 as a result of the piezoelectric response of the specimen, for example, P(VDF-TrFE) polymer, under compression was captured by the data acquisition system 50. It can be seen that the amount and rate of charge accumulation was dependent on the compression distance, as well as the rate of compression. At the highest tested compression rate of 500 mm/min at a compression distance of 1.5 mm, the charge (e.g., voltage) generated within the specimen 20 produced ~100 mV of open circuit voltage in the metal features 30. At the lowest tested compression rate of 50 mm/min at a compression distance of 1 mm, the charge (e.g., voltage) generated within the specimen 20 produced ~30 mV of open circuit voltage. It can clearly be seen that the rate of charge accumulation is dependent on the compression rate in the specimen 20. However, the charge dissipation rate from the metal features 30 showed little dependence and was observed to be somewhat invariant of testing parameters.

In another embodiment of the subject matter disclosed herein, an additive manufacturing method of producing a polymeric structure so as to have selectable piezoelectric properties is provided. The method includes steps of: coupling an ultrasound generating device to a print head (e.g., 120, FIGS. 2, 6) of the additive manufacturing apparatus (e.g., 100, FIG. 2, or 101, FIG. 6); transmitting acoustic energy from the ultrasound generating device (e.g., transducer 160, FIGS. 2, 6) to the print head (e.g., containing a feed material 22, FIG. 6) to vibrate the print head in an oscillatory manner; extruding a feed material from the print head; moving the print head in at least one dimension relative to a substrate (e.g., 10, FIGS. 2, 6) on which the structure is being manufactured; and, optionally, dispensing layers sequentially on top of each other to form the structure. In some embodiments, the feed material is a polymeric material, the method further including heating the feed material by a heater block (e.g., 126, FIGS. 2, 6) within a hot-end section (e.g., 124, FIGS. 2, 6) of the print head to form a polymer melt. In some embodiments, the method includes extruding the polymer melt from a nozzle of the print head, the nozzle being coaxial to the longitudinal axis of the print head.

According to the method, it is advantageous to couple the ultrasound generating device to the print head and transmit the acoustic energy to the print head because the acoustic energy causes an alignment and/or relaxation of polymeric chains within the polymer melt after it had been melted within the print head (e.g., by the heater block). One of the primary advantages associated with the use of the acoustic energy is the alignment and/or relaxation of the polymeric chains, which in turn causes the resultant structure to have piezoelectric properties. Once the polymeric chains are aligned and/or relaxed by the acoustic energy, the arrangement of the polymeric chains can be fixed within the structure by cooling the polymer melt after extrusion from the print head, such that the alignment and/or relaxation of the polymeric chains is maintained by a hardening of the polymer melt during the cooling thereof.

In some advantageous embodiments, the polymeric material comprises polyvinylidenefluoride (PVDF) and/or a copolymer thereof, including poly[vinylidenefluoride-co-trifluoroethylene] (P(VDF-TrFE)).

The method further includes the ability to make only designated portions of the structure have the piezoelectric properties disclosed herein, such that certain predefined regions of the structure can have piezoelectric properties, while other predefined regions of the structure will not have piezo electric properties, instead acting as an insulator. The selective piezoelectric properties can be accomplished by selectively transmitting acoustic energy to the print head by changing the ultrasound generating device between an on state and an off state. As such, when the apparatus is producing a portion of the structure that is to have piezoelectric properties, the ultrasound generating device is activated (e.g., turned on), such that the polymeric chains within the polymer melt to be deposited to form the portion of the structure that is to have piezoelectric properties are aligned and/or relaxed. Then, when the apparatus is producing a different portion of the structure that is not specified as having piezoelectric properties, but is instead to act as an insulator, the ultrasound generating device is deactivated (e.g., turned off), such that the polymeric chains within the polymer melt to be deposited to form the portion of the structure that is to have piezoelectric properties are not aligned and/or relaxed, at least not to any degree beyond which such polymeric chains are naturally aligned and/or relaxed during the melting of such polymeric material in the absence of ultrasonic acoustic energy.

Thus, in order to provide the aforementioned discrete regions of the structure with piezoelectric properties, the method includes the steps of: dispensing portions of the structure while the ultrasound generating device is in the on state so that the portions of the structure have piezoelectric properties; and dispensing other portions of the structure while the ultrasound generating device is in the off state so that the other portions of the structure do not have piezoelectric properties and act as insulators.

In forming the structure, each dispensed layer has a shape corresponding to a portion of a cross-section of the structure being manufactured.

According to the method, the acoustic energy transmitted to the print head advantageously has a frequency that is the same as, or is substantially similar to, the natural frequency of the apparatus, such that the step of vibrating the print head in the oscillatory manner includes moving the print head in a direction orthogonal to a longitudinal axis of the print head and/or in a direction parallel to the longitudinal axis of the print head.

REFERENCES

All references cited herein, including but not limited to all patents, patent applications and publications thereof, scientific journal articles, and database entries (e.g., GEN-BANK® database entries and all annotations available therein) are incorporated herein by reference in their entireties to the extent that they supplement, explain, provide a background for, or teach methodology, techniques, and/or compositions employed herein.

[1] P. Martins, A. C. Lopes, and S. Lanceros-Mendez (2014) Electroactive phases of poly(vinylidene fluoride): Determination, processing and applications. *Progress in Polymer Science*, vol. 39, no. 4, pp. 683-706.

[2] K. Omote, H. Ohigashi, and K. Koga (1997) Temperature dependence of elastic, dielectric, and piezoelectric properties of "single crystalline" films of vinylidene fluoride trifluoroethylene copolymer. *Journal of Applied Physics*, vol. 81, no. 6, pp. 2760-2769.

[3] L. Bovey (1987) PVDF Applications—PVDF—a Versatile Electrically Active Polymer Fulmer-Research-Institute, 28 Oct. 1986. *Physics in Technology*, vol. 18, no. 2, pp. 91-91.

[4] P. A. Payne, C. Edwards, R. Y. Faddoul, and A. J. Allison (1985) Applications of PVDF Transducers. *British Journal of Radiology*, vol. 58, no. 687, pp. 278-278.

[5] Q. Sabrina, N. Majid, and B. Prihandoko (2016) Application of PVDF composite for lithium-ion battery separator. *8th International Conference on Physics and Its Applications (Icopia)*, vol. 776.

[6] H. H. Singh, S. Singh, and N. Khare (2018) Enhanced-phase in PVDF polymer nanocomposite and its application for nanogenerator. *Polymers for Advanced Technologies*, vol. 29, no. 1, pp. 143-150.

[7] Y. A. Yildirim, A. Toprak, and O. Tigli (2018) Piezoelectric Membrane Actuators for Micropump Applications Using PVDF-TrFE. *Journal of Microelectromechanical Systems*, vol. 27, no. 1, pp. 86-94.

[8] M. Kim, Y. S. Wu, E. C. Kan, and J. Fan (2018) Breathable and Flexible Piezoelectric ZnO@PVDF Fibrous Nanogenerator for Wearable Applications. *Polymers*, vol. 10, no. 7, 745.

[9] E. Fukada (2000) History and recent progress in piezoelectric polymers. *Ieee Transactions on Ultrasonics Ferroelectrics and Frequency Control*, vol. 47, no. 6, pp. 1277-1290.

[10] D. A. Porter, T. V. T. Hoang, and T. A. Berfield (2017) Effects of in-situ poling and process parameters on fused filament fabrication printed PVDF sheet mechanical and electrical properties. *Additive Manufacturing*, vol. 13, pp. 81-92.

[11] S. Andre-Castagnet and S. Tence-Girault (2002) Relationships between mechanical tensile behavior and micromechanisms in poly(vinylidene fluoride) at high temperatures: Influence of the molecular weight distribution. *Journal of Macromolecular Science-Physics*, vol. B41, no. 4-6, pp. 957-976.

[12] V. Sencadas, R. Gregorio, and S. Lanceros-Mendez (2009) alpha to beta Phase Transformation and Microestructural Changes of PVDF Films Induced by Uniaxial Stretch. *Journal of Macromolecular Science Part B-Physics*, vol. 48, no. 3, pp. 514-525.

[13] B. Mohammadi, A. A. Yousefi, and S. M. Bellah (2007) Effect of tensile strain rate and elongation on crystalline structure and piezoelectric properties of PVDF thin films. *Polymer Testing*, vol. 26, no. 1, pp. 42-50.

[14] H. Han, Y. Nakagawa, Y. Takai, K. Kikuchi, S. Tsuchitani, and Y. Kosimoto (2012) Microstructure fabrication on a beta-phase PVDF film by wet and dry etching technology. *Journal of Micromechanics and Microengineering*, vol. 22, no. 8.

[15] M. Benz, W. B. Euler, and O. J. Gregory (2002) The role of solution phase water on the deposition of thin films of poly(vinylidene fluoride). *Macromolecules*, vol. 35, no. 7, pp. 2682-2688.

[16] S. Lanceros-Mendez, J. F. Mano, A. M. Costa, and V. H. Schmidt (2001) FTIR and DSC studies of mechanically deformed beta-PVDF films. *Journal of Macromolecular Science-Physics*, vol. B40, no. 3-4, pp. 517-527.

[17] A. Salimi and A. A. Yousefi (2003) FTIR studies of beta-phase crystal formation in stretched PVDF films. *Polymer Testing*, vol. 22, no. 6, pp. 699-704.

[18] C. Y. Kong and R. C. Soar (2005) Fabrication of metal-matrix composites and adaptive composites using ultrasonic consolidation process. *Materials Science and Engineering a-Structural Materials Properties Microstructure and Processing*, vol. 412, no. 1-2, pp. 12-18.

[19] W. Liu, M. D. Han, X. M. Sun, and H. X. Zhang (2014) Fabrication of Spiral-Shaped PVDF Cantilever Based Vibration Energy Harvester. *2014 9th Ieee International Conference on Nano/Micro Engineered and Molecular Systems (Nems)*, pp. 458-461.

[20] C. H. Loh and R. Wang (2014) Fabrication of PVDF hollow fiber membranes: Effects of low-concentration Pluronic and spinning conditions. *Journal of Membrane Science*, vol. 466, pp. 130-141.

[21] W. L. Yang, W. H. He, F. Zhang, M. A. Hickner, and B. E. Logan (2014) Single-Step Fabrication Using a Phase Inversion Method of Poly(vinylidene fluoride) (PVDF) Activated Carbon Air Cathodes for Microbial Fuel Cells. *Environmental Science & Technology Letters*, vol. 1, no. 10, pp. 416-420.

[22] G. Haghiashtiani and M. A. Greminger (2015) Fabrication, polarization, and characterization of PVDF matrix composites for integrated structural load sensing. *Smart Materials and Structures*, vol. 24, no. 4.

[23] M. L. Nallappan and M. M. Nasef (2015) Optimization of Elecrospinning of PVDF Scaffolds Fabrication Using Response Surface Method. *Journal Teknologi*, vol. 75, no. 6, pp. 103-107.

[24] S. Bodkhe, G. Turcot, F. P. Gosselin, and D. Therriault (2017) One-Step Solvent Evaporation-Assisted 3D Printing of Piezoelectric PVDF Nanocomposite Structures. *ACS Applied Materials & Interfaces*, vol. 9, no. 24, pp. 20833-20842.

[25] A. C. Lopes, J. Gutierrez, and J. M. Barandiaran (2018) Direct fabrication of a 3D-shape film of polyvinylidene fluoride (PVDF) in the piezoelectric beta-phase for sensor and actuator applications. *European Polymer Journal*, vol. 99, pp. 111-116.

[26] H. Kim, F. Torres, D. Villagran, C. Stewart, Y. R. Lin, and T. L. B. Tseng (2017) 3D Printing of BaTiO3/PVDF Composites with Electric In Situ Poling for Pressure Sensor Applications. *Macromolecular Materials and Engineering*, vol. 302, no. 11.

[27] H. Kim, F. Torres, Y. Y. Wu, D. Villagran, Y. R. Lin, and T. L. Tseng (2017) Integrated 3D printing and corona poling process of PVDF piezoelectric films for pressure sensor application. *Smart Materials and Structures*, vol. 26, no. 8.

[28] S. Liao, J. Sackmann, A. Tollkotter, M. Pasterny, N. Kockmann, and W. K. Schomburg (2017) Ultrasonic fabrication of micro nozzles from a stack of PVDF foils for generating and characterizing microfluidic dispersions. *Microsystem Technologies-Micro-and Nanosystems-Information Storage and Processing Systems*, vol. 23, no. 3, pp. 695-702.

[29] H. Kim, T. Fernando, M. Y. Li, Y. R. Lin, and T. L. B. Tseng (2018) Fabrication and characterization of 3D printed BaTiO3/PVDF nanocomposites. *Journal of Composite Materials*, vol. 52, no. 2, pp. 197-206.

[30] B. N. Turner and S. A. Gold (2015) A review of melt extrusion additive manufacturing processes: II. Materials, dimensional accuracy, and surface roughness. *Rapid Prototyping Journal*, vol. 21, no. 3, pp. 250-261.

[31] B. Brenken, E. Barocio, A. Favaloro, V. Kunc, and R. B. Pipes (2018) Fused filament fabrication of fiber-reinforced polymers: A review. *Additive Manufacturing*, vol. 21, pp. 1-16.

[32] B. B. Shahriar, C. Arthur, C. France, and N. Valerie (2018) Influence of parameters controlling the extrusion step in Fused Filament Fabrication (FFF) process applied to polymers using numerical simulation. *Proceedings of 21st International Esaform Conference on Material Forming* (Esaform 2018), vol. 1960.

[33] C. McIlroy and P. D. Olmsted (2017) Disentanglement effects on welding behaviour of polymer melts during the fused-filament-fabrication method for additive manufacturing. *Polymer*, vol. 123, pp. 376-391.

[34] A. D'Amico and A. M. Peterson (2018) An adaptable FEA simulation of material extrusion additive manufacturing heat transfer in 3D. *Additive Manufacturing*, vol. 21, pp. 422-430.

[35] K. M. Rahman, T. Letcher, and R. Reese (2016) Mechanical Properties of Additively Manufactured Peek Components Using Fused Filament Fabrication. *Proceedings of the Asme International Mechanical Engineering Congress and Exposition*, 2015, Vol 2a.

[36] A. R. Torrado and D. A. Roberson (2016) Failure Analysis and Anisotropy Evaluation of 3D-Printed Tensile Test Specimens of Different Geometries and Print Raster Patterns. *Journal of Failure Analysis and Prevention*, vol. 16, no. 1, pp. 154-164.

[37] D. L. Jiang and D. E. Smith (2017) Anisotropic mechanical properties of oriented carbon fiber filled polymer composites produced with fused filament fabrication. *Additive Manufacturing*, vol. 18, pp. 84-94.

[38] C. Shemelya et al. (2017) Anisotropy of thermal conductivity in 3D printed polymer matrix composites for space based cube satellites. *Additive Manufacturing*, vol. 16, pp. 186-196.

[39] N. G. Tanikella, B. Wittbrodt, and J. M. Pearce (2017) Tensile strength of commercial polymer materials for fused filament fabrication 3D printing. *Additive Manufacturing*, vol. 15, pp. 40-47.

[40] J. Bartolai, T. W. Simpson, and R. X. Xie (2018) Predicting strength of additively manufactured thermoplastic polymer parts produced using material extrusion. *Rapid Prototyping Journal*, vol. 24, no. 2, pp. 321-332.

[41] C. O. Balderrama-Armendariz, E. MacDonald, D. Espalin, D. Cortes-Saenz, R. Wicker, and A. Maldonado-Macias (2018) Torsion analysis of the anisotropic behavior of FDM technology. *International Journal of Advanced Manufacturing Technology*, vol. 96, no. 1-4, pp. 307-317.

[42] A. Tofangchi, Han, P., Hsu, K. (submitted) Ultrasound-Vibration Assisted Fused Filament Fabrication for Improved Mechanical Property Isotropy in 3D printed ABS. *Journal of Additive Manufacturing*.

[43] A. Tofangchi, Han, P., Hsu, K. (submitted) Ultrasound Induced Crystalline Beta-phase Formation in Fused Filament Fabrication Printed PVDF. *Journal of Additive Manufacturing*.

[44] G. S. Chen, S. Y. Guo, and H. L. Li (2002) Ultrasonic improvement of rheological behavior of polystyrene. *Journal of Applied Polymer Science*, vol. 84, no. 13, pp. 2451-2460.

[45] Y. Z. Chen and H. L. Li (2004) Effect of ultrasound on extrusion of PP/EPDM blends: Structure and mechanical properties. *Polymer Engineering and Science*, vol. 44, no. 8, pp. 1509-1513.

[46] Y. Z. Chen and H. L. Li (2005) Effect of ultrasound on the morphology and properties of polypropylene/inorganic filler composites. *Journal of Applied Polymer Science*, vol. 97, no. 4, pp. 1553-1560.

[47] Y. Z. Chen and H. L. Li (2007) Mechanism for effect of ultrasound on polymer melt in extrusion. *Journal of Polymer Science Part B-Polymer Physics*, vol. 45, no. 10, pp. 1226-1233.

[48] A. I. Isayev, C. Jung, K. Gunes, and R. Kumar (2008) Ultrasound assisted single screw extrusion process for dispersion of carbon nanofibers in polymers. *International Polymer Processing*, vol. 23, no. 4, pp. 395-405.

[49] W. Y. Guo, B. Peng, and Q. P. Ruan (2009) Ultrasonic Oscillations Effect on Extrusion Processing, Structure, and Properties of Blends of Propylene Based Plastomer and Ethylene/1-Octene Copolymer. *Journal of Reinforced Plastics and Composites*, vol. 28, no. 22, pp. 2701-2715.

[50] J. Y. Chen, Y. Z. Chen, H. L. Li, S. Y. Lai, and J. Jow (2010) Physical and chemical effects of ultrasound vibration on polymer melt in extrusion. *Ultrasonics Sonochemistry*, vol. 17, no. 1, pp. 66-71.

[51] A. A. Panov, T. A. Anasova, G. E. Zaikov, and A. K. Panov (2011) Influence of ultrasound on the basic parameters of the extrusion of polymer melts. *Theoretical Foundations of Chemical Engineering*, vol. 45, no. 4, pp. 436-442.

[52] C. J. L. Constantino et al. (2005) Phase transition in poly(vinylidene fluoride) investigated with micro-Raman spectroscopy. *Applied Spectroscopy*, vol. 59, no. 3, pp. 275-279.

While the subject matter has been described herein with reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. For example, such barriers may be used as an enclosure for patios, driveways, driveway entrances, fences, docks, and the like.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method of producing a structure having selectable piezoelectric properties using an additive manufacturing apparatus, the method comprising:
coupling an ultrasound generating device to a print head of the additive manufacturing apparatus;
transmitting acoustic energy from the ultrasound generating device to the print head to vibrate the print head in an oscillatory manner;
extruding a feed material comprising a polymeric material comprising polyvinylidenefluoride (PVDF) and/or a co-polymer thereof from the print head;
moving the print head in at least one dimension relative to a substrate on which the structure is being manufactured; and dispensing layers sequentially on top of each other to form the structure, wherein the dispensing comprises:
   dispensing portions of the structure while the ultrasound generating device is in an on state so that the portions of the structure have piezoelectric properties; and
   dispensing other portions of the structure while the ultrasound generating device is in an off state so that the other portions of the structure do not have piezoelectric properties and act as insulators.

2. The method of claim 1, wherein the polymeric material is heated by a heater block within a hot-end section of the print head to form a polymer melt.

3. The method of claim 2, wherein the acoustic energy causes an alignment and/or relaxation of polymeric chains within the polymer melt.

4. The method of claim 3, wherein the alignment and/or relaxation of the polymeric chains causes the structure to have piezoelectric properties.

5. The method of claim 4, comprising cooling the polymer melt after extrusion from the print head to fix the polymeric chains within the polymer melt, such that the alignment and/or relaxation of the polymeric chains is maintained by a hardening of the polymer melt during the cooling thereof.

6. The method of claim 1, wherein the polymeric material comprises poly[vinylidenefluoride-co-trifluoroethylene] (P(VDF-TrFE)).

7. The method of claim 1, wherein transmitting acoustic energy comprises selectively applying acoustic energy to the print head by changing the ultrasound generating device between an on state and an off state.

8. The method of claim 1, wherein each layer being dispensed has a shape corresponding to a portion of a cross-section of the structure being manufactured.

9. The method of claim 1, wherein vibrating the print head in the oscillatory manner comprises moving the print head in a direction orthogonal to a longitudinal axis of the print head and/or in a direction parallel to the longitudinal axis of the print head.

10. The method of claim 2, wherein the polymer melt is extruded from a nozzle of the print head, the nozzle being coaxial to a longitudinal axis of the print head.

* * * * *